United States Patent [19]

Weber

[11] 4,244,930
[45] Jan. 13, 1981

[54] METHOD FOR THE WET SEPARATION OF IMPURITIES FROM GASES OF HIGHER TEMPERATURE

[76] Inventor: Ekkehard Weber, Amselweg 6, 4300 Essen 17, Fed. Rep. of Germany

[21] Appl. No.: 28,197

[22] Filed: Apr. 9, 1979

[30] Foreign Application Priority Data

Apr. 10, 1978 [DE] Fed. Rep. of Germany ....... 2815446

[51] Int. Cl.³ ............................................. B01D 53/34
[52] U.S. Cl. ................................. 423/210.5; 423/225; 423/234; 423/235; 423/242; 423/244; 423/DIG. 12
[58] Field of Search ............ 423/210.5, 242 R, 242 A, 423/235, 244 A, 234, 225, DIG. 12

[56] References Cited

U.S. PATENT DOCUMENTS

| 3,475,121 | 10/1969 | Thornton ......................... 423/244 A |
| 3,715,187 | 2/1973 | Bartholomew et al. ......... 423/242 A |
| 3,919,390 | 11/1975 | Moore ............................... 423/210.5 |

*Primary Examiner*—Earl C. Thomas
*Attorney, Agent, or Firm*—Herbert L. Lerner

[57] ABSTRACT

Wet separation at high temperatures of acidic impurities from gases. The gases are scrubbed with a melt of an alkali metal compound in which a solid alkaline earth metal compound is dispersed.

5 Claims, 1 Drawing Figure

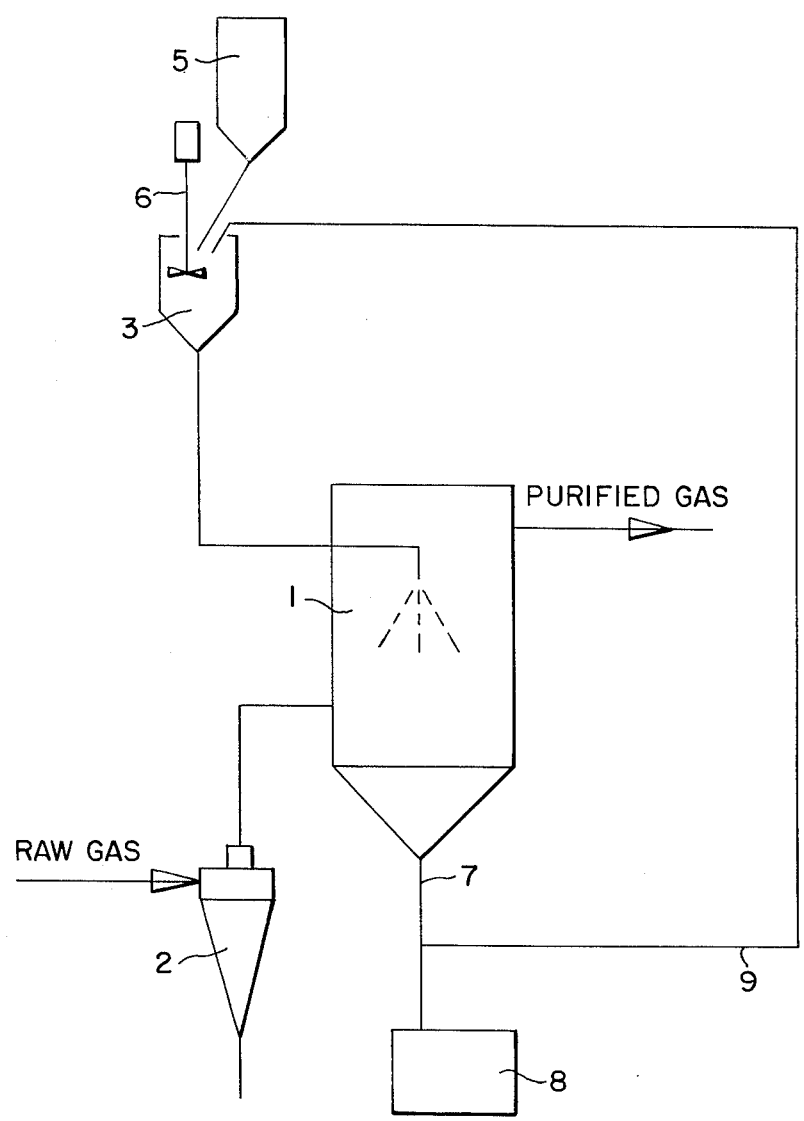

METHOD FOR THE WET SEPARATION OF IMPURITIES FROM GASES OF HIGHER TEMPERATURE

BACKGROUND OF THE INVENTION

1. Field of the Invention

The invention relates to a method for the wet separation of acidic impurities from gases containing the same which gases are to be scrubbed at an elevated temperature, preferably above 575° K.

2. Description of the Prior Art

In various industrial processes, gases containing acidic constituents as impurities, for example sulfur dioxide, are produced. Considerable effort has been directed to this problem but improvement is yet required particularly in scrubbing gases at high temperatures above about 600° K.

It is known to use, metal melts such as, for instance, melts of tin or tin-containing alloys (German Published Prosecuted Application DE-AS 26 05 249) for scrubbing gases which have no oxidizing properties and which are to be scrubbed at an elevated temperature, for instance, above 575° K. It is also known to carry out such scrubbing methods with salt melts (Battelle Study R&D Report 100, entitled "A process for cleaning and removal of sulfur compound from low-BTU gases", Washington, August 1974). According to this investigation, a solution of calcium carbonate in a molten eutectic mixture of potassium carbonate, sodium carbonate and lithium carbonate is used as the washing fluid. The operating range of this mixture is at temperatures above about 875° K. According to this investigation, gas with temperatures above 800° C., was so purified. This is a temperature range in which difficulties in separating them from the scrubbed gas can be expected due to the elevated vapor pressures of the alkali salts. Since lithium salts are used in this mixture, the costs of this melt are high. Due to these high costs of the raw material, it is necessary to reprocess the melts used. According to the Battelle study, this requires considerable expenditures and it is unclear, at least up to now, whether a melt containing the separated impurities can be reprocessed at all economically. In any event, the cost burden due to the gas scrubbing according to the Battelle study, which is determined by the continuous consumption of salts and salt mixtures and by the disposal costs, is so high that economical utilization is questionable.

SUMMARY OF THE INVENTION

An object of the present invention is to provide a method for the wet separation of acidic impurities from a gas which can be used at an elevated temperature, above 575° K., which overcomes the disadvantages of the present state of the art and which, in addition, is economical.

With the foregoing and other objects in view, there is provided in accordance with the invention, a method for the wet separation at high temperatures of acidic impurities from gases containing the same, which comprises passing a melt of an alkali metal compound in which a solid alkaline earth metal compound is dispersed in intimate contact with the gases containing the acidic impurities at a temperature above 575° K. to effect separation of acidic impurities from the gases, and after intimate contact between the gases and the melt, discharging as separate streams, the purified gases from which the acidic impurities have been removed and the melt with the dispersed solid alkaline earth metal compound containing acidic impurities.

Other features which are considered as characteristic for the invention are set forth in the appended claims.

Although the invention is illustrated and described herein as embodied in a method for the wet separation of impurities from gases of higher temperature, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which, diagrammatically illustrates one method of carrying out the invention.

DETAILED DESCRIPTION OF THE INVENTION

In accordance with the invention, the washing fluid used in the wet separator to scrub the raw gases containing the acidic impurities is a melt of alkali metal compounds in which solid alkaline earth metal compounds are dispersed. The content of solid alkaline earth metal compounds in the melt serving as the washing fluid is preferably from 20% up to 60% based on the combined weight of melt and solid alkaline earth metal compounds dispersed therein. The use of alkali metal hydroxides, especially sodium hydroxide and alkaline earth metal oxides, especially calcium oxide are preferred. The wet separation according to the method of the invention can be preceded by a known pre-separation treatment to remove entrained solid particles and liquid droplets from the raw gas.

Referring to the drawing, numeral 1 denotes a conventional wet separator which may be a spray nozzle scrubber or a venturi scrubber, and which is not the subject of the invention. Raw gas containing acidic impurities is introduced into a conventional preliminary separator 2, which may be a cyclone and which precedes the wet separator 2. A supply tank 3 contains the melt in the form of alkali metal compounds which are used as the washing liquid and into which solid alkaline earth metal compounds are introduced from a second supply tank 5. A stirrer 6 disperses these solid alkaline earth metal compounds in the alkali metal compound melt. The washing liquid flows downwardly through a nozzle in wet separator 3 counter-current to and in intimate contact with the uprising raw gases containing the impurities. The washing liquid loaded with the separated impurities leaves the bottom of wet separator 1 through line 7. Part of the stream flowing through line 7 is returned through line 9 to the supply tank 3. The other part of the stream flowing through line 7 is fed to a cooler and crusher 8 wherein the melt solidifies and is comminuted for transport. Removing of part of the washing liquid corresponds to the consumption and ultimately serves for keeping a tolerable level of contamination in the return of the washing liquid. If the return is dispensed with, the operation should be adjusted preferably to a stoichiometric consumption of reaction partners. If this is observed, gaseous impurities such a sulfur dioxide can be separated, in addition to dust and mist.

In investigating the behavior of the method according to the invention on a laboratory scale, an exhaust gas stream at 775° K. was simulated. For this purpose, 300 m³/H stack gas containing 80.2 vol. % nitrogen and 14.8 vol. % carbon dioxide and about 4% by volume oxygen was used. The remainder of about 1% was distributed between carbon monoxide, sulfur dioxide and nitrous oxides. Of the impurities to be separated, dust was determined as 1.24 g/m³ and sulfur dioxide as 1.02 g/m³. This gas was scrubbed in a wet separator of the venturi type with 0.8 kg of melt per hour. The melt consisted of 47.5% by weight sodium hydroxide and 52.4% by weight calcium oxide. It was possible to recover the salt melt used almost completely from the separator, as referred to the melt used. The melt absorbed, based on one hour's time, 8 g carbon dioxide and 294 g sulfur dioxide as well as 357 g dust. The impurities in the purified gas were reduced to 0.05 g/m³ dust and 0.04 g/m³ sulfur dioxide. The scrubber operated according to the invention had a separation efficiency of about 96% for dust as well as for sulfur dioxide; nitrite and nitrate could not be detected. However, the separation efficiency for nitrous oxides was not determined. The temperature of 775° K. was nearly unchanged during the passage of the gas through the separator.

It was found in the tests that the scrubbing liquid used in the method according to the invention shows a surprisingly good disposal behavior. The sulfur dioxide first saturates the alkali metal compound and is then absorbed by the alkaline earth metal compound. As a result, the alkali metal compounds are disposed almost exclusively as alkali metal sulfite, alkali metal sulfite hydrate and alkali metal sulfate, while the alkaline earth compounds as a rule can be present in excess as not fully utilized reaction partners. In addition, the components of this washing liquid are inexpensive commercial products, so that the economic feasibility of the method is assured. Subjecting the gases to a preliminary separation is advantageous for gases with high dust of mist concentrations so as not to affect the flow behavior of the washing liquid adversely by separated fly dust or by tar mist that may occur. Thereby, the loading of the washing liquid with separated solids can be kept within limits and almost stoichiometric utilization of the washing liquid for separating gaseous impurities by reacting with the components of the washing liquid can be achieved. A special advantage turned out to be that the gas to be purified can retain its heat content almost without change which is valuable because of its high temperature.

I claim:

1. Method for the wet separation at high temperatures of gaseous acid impurities from gases containing the same produced in industrial processes which comprises passing a liquid melt of an inorganic alkali metal compound reactive with said gaseous acid impurities in which a solid inorganic alkaline earth metal compound reactive with said gaseous acid impurities is dispersed therein, in intimate contact with the gases containing the gaseous acid impurities at a temperature above 575° K. to effect separation of acidic impurities from the gases, said liquid alkali metal compound being more reactive than said solid alkaline earth metal compound and is saturated first by the gaseous acid impurities, and after intimate contact between the gases and the melt, discharging as separate streams, the purified gases from which the gaseous acid impurities have been removed and the melt with the dispersed solid alkaline earth metal compound containing the impurities.

2. Method according to claim 1, wherein the content of solid alkaline earth metal compound in the melt is up to 60% of the weight of melt and alkaline earth metal compound.

3. Method according to claim 2, wherein an alkali metal hydroxide is the alkali metal compound and an alkaline earth metal oxide is the alkaline earth metal compound.

4. Method according to claim 3, wherein the alkali metal hydroxide is sodium hydroxide and the alkaline earth metal oxide is calcium oxide.

5. Method according to claim 1, wherein the gases are passed through a separator prior to contact with the melt to remove suspended solids and liquid droplets entrained in the gases.

* * * * *